United States Patent [19]
Katter

[11] 3,961,806
[45] June 8, 1976

[54] TWO STAGE INFLATION SYSTEM

[75] Inventor: Lincoln B. Katter, Lynnwood, Wash.

[73] Assignee: Rocket Research Corporation, Redmond, Wash.

[22] Filed: Feb. 4, 1972

[21] Appl. No.: 223,461

[52] U.S. Cl. ............................ 280/732; 137/576; 222/3
[51] Int. Cl.² ...................................... B60R 21/08
[58] Field of Search .............. 280/150 AB; 222/6, 3; 141/100, 105, 19, 4; 137/576

[56] References Cited
UNITED STATES PATENTS

| | | | |
|---|---|---|---|
| 3,473,824 | 10/1969 | Carey et al. | 280/150 AB |
| 3,477,740 | 11/1969 | Hass | 280/150 AB |
| 3,516,685 | 6/1970 | Goetz | 280/150 AB |
| 3,527,475 | 9/1970 | Carey et al. | 280/150 AB |
| 3,614,127 | 10/1971 | Glance | 280/150 AB |
| 3,624,810 | 11/1971 | Hass | 280/150 AB |
| 3,632,133 | 1/1972 | Hass | 280/150 AB |
| 3,674,059 | 7/1972 | Stephenson | 141/4 |
| 3,689,105 | 9/1972 | Matsui et al. | 280/150 AB |
| 3,692,495 | 9/1972 | Schneiter et al. | 280/150 AB |
| 3,721,456 | 3/1973 | McDonald | 280/150 AB |

Primary Examiner—M. H. Wood, Jr.
Assistant Examiner—John P. Silverstrim
Attorney, Agent, or Firm—Graybeal, Barnard, & Uhlir

[57] ABSTRACT

A crash restraint apparatus comprising a bag which is inflated to its protective position by an aspirating inflating device, with a two stage compressed gas source to supply aspirating gas to the inflating device. The two stage gas source comprises a high pressure container having a first chamber with a less restricted outlet opening to supply high flow rate aspirating gas during an initial inflation phase, and a second chamber having a more restricted outlet to supply lower flow rate aspirating gas during a later inflation phase. With the passenger in the normal position resting against the back of the car seat, the bag will inflate to its fully inflated position. In the event an occupant is at a forward position adjacent the bag, during the initial inflating phase the bag is inflated to an intermediate position where it inflates around the occupant but does not move him rearwardly to any appreciable extent. Thereafter, during the later inflating phase the flow of inflating gas is desirably no greater or less than the outflow of inflating gas through vent means for gas pressure in the bag, and at most only moderately greater than the outflow of gas from the bag, so that the passenger is not hurled rearwardly by too rapid inflation of the bag.

32 Claims, 5 Drawing Figures

TWO STAGE INFLATION SYSTEM

BACKGROUND OF THE INVENTION a. Field of the Invention

This invention relates to a crash restraint system in which an inflatable is inflated to prevent a passenger in an automobile from being thrown violently against the steering wheel, dashboard or other automobile structure.

b. Description of the Prior Art

There are in the prior art various devices which cause a protective bag to inflate in front of a driver or passenger to cushion him from impact with the steering wheel, dashboard or other vehicle structure. Usually the device is activated by an inertial switch responsive to a crash impact of the automobile. This inertial switch in turn causes an inflating device to quickly inflate the collapsed bag into its inflated position deployed in front of the driver or passenger. The inflating gas is generally supplied from a source of compressed air or other compressed gas, such as shown in U.S. Pat. Nos. 3,411,808; 3,414,031 and a number of other patents in the crash restraint field.

One of the major problems in such crash restraint systems is the "out of position passenger" problem. To act as an effective cushion in a crash situation, the bag must be moved from its collapsed position to its inflated position in an extremely short period of time (in the order of 20 to 40 milliseconds). In the situation where one of the passengers (e.g. a child) happens to be leaning or standing against the dashboard when the bag inflates, or where there is a panic braking situation just prior to crash impact so that the passenger is moved against the dashboard, the rapid expansion of the bag in many prior art inflating systems will throw the passenger backwards against the car seat with such energy that the passenger may be injured. With the use of a container of high pressure gas or air, as shown in many prior art devices, even though pressure in the container declines as inflation progresses, for the pressure to be sufficiently high to inflate the bag properly during the initial stage of inflation, the pressure at the later stage of inflation still is at a level that the inflation is sufficiently rapid to possibly cause serious injury.

SUMMARY OF THE INVENTION

In the present invention, there is a two stage inflating device. In the initial inflating phase there is a higher rate of flow of inflating gas adequate to fill the bag to an intermediate inflated position (which is the position the bag assumes when inflating around an occupant who is in a forward position proximate the bag). In a later inflating phase, there is a lower flow of inflating gas which, with the passenger in the normal position resting against the back of the car seat, is sufficient to inflate the bag to its fully inflated position to provide a protective cushion. However, with the occupant in a forward position adjacent the bag, the lower flow during the later inflating phase is desirably moderately less than, or at most only moderately greater than, the outflow of inflating gas through vent means operatively connected to the inflatable bag, so that the occupant is either cushioned as the occupant remains in the forward position or the occupant is at most moved at a moderate rate rearwardly in the car.

In the preferred embodiment, the inflating device is an aspirating inflating device. The two stage source of inflating gas is a source of aspirating gas comprising first means to deliver aspirating gas at a high flow rate during the initial phase and second means to deliver aspirating gas at a substantially lower flow rate during the later phase. In the preferred form, this comprises a high pressure container having a forward or downstream chamber and a rearward or upstream chamber. The outlet from the forward chamber is relatively large (i.e. less restricted), and the outlet from the rear chamber is smaller (i.e. more restricted). The initial flow into the aspirating unit is from the forward chamber, and the later flow is from the rearward chamber.

In a crash situation where the occupant is positioned forwardly adjacent the collapsed bag, the bag during the initial inflating phase inflates to the intermediate position where it engages the occupant and inflates around the sides of the occupant. Since the occupant is then causing an effective back pressure against the bag, the aspirating device, being sensitive to such pressure, is caused to stall so that substantially only the aspirating gas is then flowing into the bag. This flow is such, relative to the vent means, that moderate deflation or no further inflation of the bag occurs, or at most only a moderate rate of inflation takes place.

For aspirating inflatable crash restraint systems presently contemplated for the right hand front passenger location, the peak flow of aspirating gas during this initial phase, measured in mass of gas flow per unit time, should be at least approximately twice, and preferably about four times, the flow during the later inflating phase. Also the flow rate during the later phase should at most decline at a relatively slow rate, while the decline of the flow rate from the initial phase to the later phase would be relatively rapid.

DESCRIPTION OF THE PREFERRED EMBODIMENT

Figure 1:
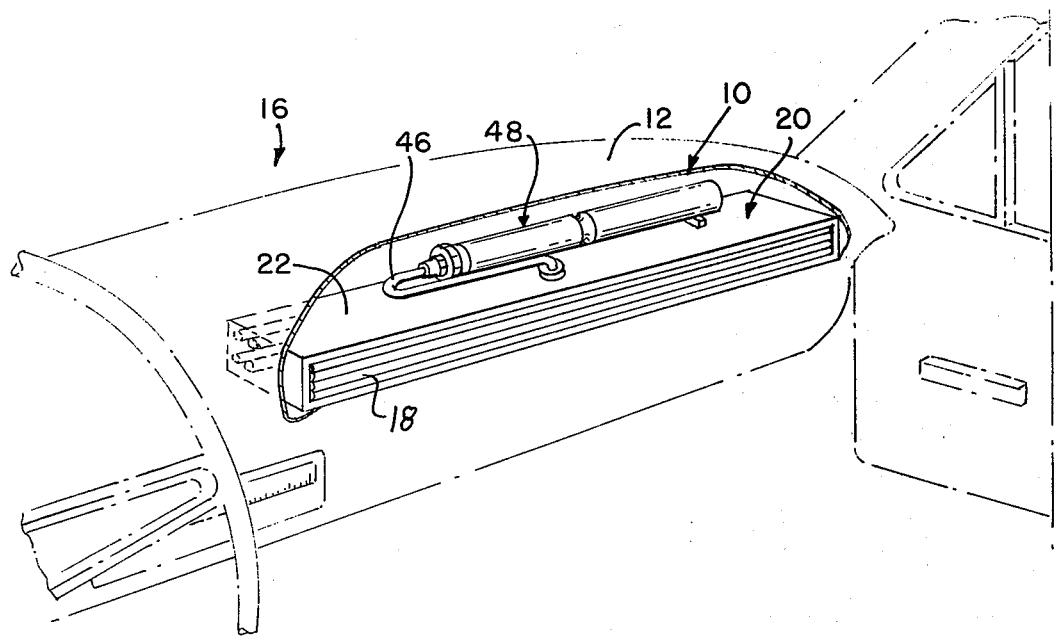
FIG. 1 is an isometric view illustrating the apparatus of the present invention.

With reference to FIG. 1, the apparatus 10 of the present invention is shown mounted in the dashboard 12 of an automobile generally designated 16. A bag or inflatable 18 is shown in full lines in its stowed position in FIG. 1.

The inflating device 20 comprises a rectangular box like housing frame 22 defining a through passageway 24 and comprising a top wall 26 a bottom wall 28 and two side walls 30. The through passageway 24 has a front inlet 32 and a rear outlet 34 facing the passenger location immediately behind. Intermediate the inlet 32 and the outlet 34 is an aspirating assembly 36 comprising a plurality of aspirating jet units 38 arranged in one or more horizontal rows (two rows as shown herein) so as to be distributed more or less evenly across the housing passageway 24. In the particular configuration shown herein, the upper row of jet units 38 is mounted to an upper transverse horizontal manifold tube 40 and the lower set of jet units 38 is similarly mounted to a lower manifold tube 42. These tubes 40 and 42 in turn are fed by a central manifold member 44 which in turn communicates by a tube 46 with an aspirating gas source 48 to be described more particularly hereinafter.

At the housing inlet 32 there is a valve mechanism, generally designated 50. This comprises a transverse screen 52 extending across the inlet opening 32. Adjacent the screen 52 and immediately rearwardly thereof are a pair of horizontal transverse fences 54 and 56, respectively. Attached to the front end of each of the fences 54 and 56 is a respective one of two flap members 58 and 60. These flaps 58 and 60 are each made of a flexible material and are connected each to its respective fence 54 or 56 at its forward horizontal center line. These two flaps 58 and 60 are so dimensioned that when positioned transversely against the screen 52, these flaps 58 and 60 close the front inlet 32.

The aforementioned aspirating gas source 48 comprises a high pressure cylindrical container 62 containing a gas such as nitrogen or air under a pressure of about 3,000 pounds per square inch and having a relatively large outlet opening 64 at the front end thereof leading into the aforementioned tube 46. This opening 64 is closed by a rupturable metal disc 66 which is explosively opened by a suitable charge such as that indicated at 68, which charge 68 is activated through lead wires 69.

The cylindrical container 62 is divided into a forward chamber 70 and rear chamber 72 by a transverse partition 74. For convenience of manufacture, this transverse partition 74 is held in place by crimping the cylinder 62 inwardly against the partition 74, as at 76. This partition 74 has a relatively small through opening or orifice 78 by which the rear chamber 72 communicates with the forward chamber 70. The rear of the chamber 70 may have a charge of gas augmenting composition (e.g. a fast burn solid propellant), such as that shown at 80, which is ignited by a fuse 82 connected to lead wires 84.

Figure 4:
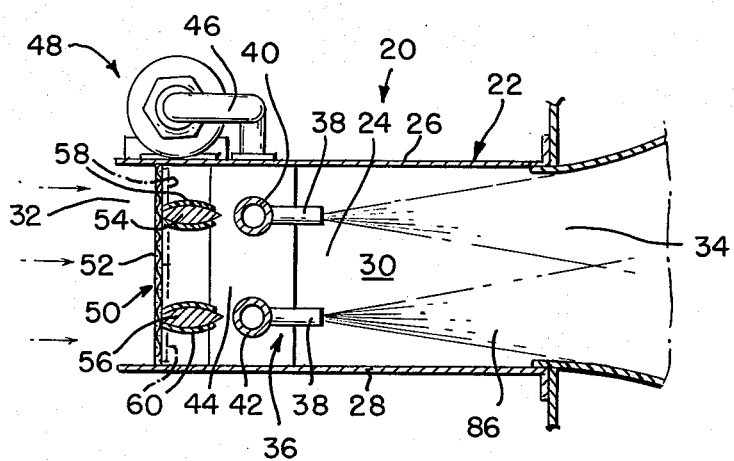
FIG. 4 is a transverse sectional view of the inflating device of the present invention.

To describe the operation of the present invention, let it be assumed that the automobile 16 is in a crash situation. A suitable crash sensor (such as one of the inertial switches shown in the prior art) sends an electric current to the explosive charge 68 through leads 69 to cause the metal disc 66 to rupture and cause an immediate outflow of the high pressure gas in the forward chamber 70. Since the front outlet opening 64 is relatively large, there is an initial high flow of gas traveling through the tube 46 to the manifold chamber 44 and out the two manifold tubes 40 and 42 to exit as high velocity jet gas streams out the jet units 38. In the first millisecond or two of gas being emitted from the jet units 38, there is a substantial back pressure from the inertia of the folded bag 18, which is just beginning to inflate. This back pressure causes the two flaps 58 and 60 of the valve assembly 50 to press against the front screen 52 so as to close the front inlet opening 32 (as shown in dotted lines in FIG. 4).

As soon as the bag 18 begins to move outwardly into the passenger compartment of the automobile 16, the back pressure from the bag 18 is reduced, and the aspirating action of the jet units 38 causes a reduction of pressure in the inlet area 32 to cause the two flap members 58 and 60 to move rearwardly against their respective fences 54 and 56 (as shown in full lines of FIG. 4) so as to open the passageway 32 and permit aspirated air to flow into the housing 22. This aspirated air mixes with the aspirating gas from the jets 38 to produce a resulting gas mixture 86 which inflates the bag 18.

Figure 5:
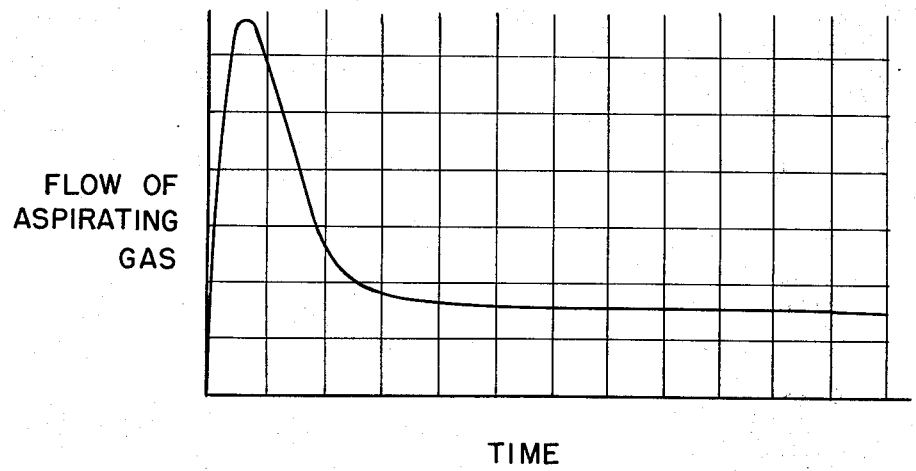
FIG. 5 is a graph illustrating the flow rate of aspirating gas during the operation of the present invention.

At approximately the same time that the disc 66 is ruptured, the gas augmenting composition 80 is ignited to supply additional gas into the rear chamber 72. While the pressure in the forward chamber 70 is rapidly decreasing because of the rapid outflow of the high pressure gas therein during the initial inflating phase of the bag 18, gas from the rear chamber 72 begins to flow through the orifice 78 into the forward chamber 70 and through the tube 46 to exit as aspirating gas from the jet units 38. However, since the orifice 78 is more restricted than the outlet opening 64, there is a lower flow rate of aspirating gas to the jet units 38. This is illustrated in the graph of FIG. 5, wherein the flow rate of aspirating gas, measured in pounds per second, is plotted against time. It can be seen that in the first several milliseconds there is a high surge in the flow rate of aspirating gas, which is attributable to the high pressure gas in the forward chamber 70 flowing through the relatively large opening 64. For purposes of description, this is designated the "initial inflation phase." Thereafter, there is a substantially uniform flow of aspirating gas at a lower flow rate, which is attributable to the gas passing through the restricted orifice 78 into the chamber 70, and finally out the aspirating units 38. This is designated the "later inflation phase." To accomplish such flow rates during the initial and later inflation phases, the effective cross sectional flow area of the less restricted flow opening 64 should be at least about three times that of the more restricted opening 78. The upper limit of this ratio is not particularly critical, since other factors (e.g. downstream flow areas) may determine maximum flow rate during the initial phase. With the container 48 having a volume of 42 cubic inches and pressured air at 3,000 pounds per square inch, and the bag 18 having a fully inflated volume of 7 cubic feet, the cross sectional area for the opening 64 should be about 0.8 square inches, and that of the opening 78 about 0.04 square inches.

Of particular significance in the present invention is the manner in which the flow rate from the gas source 48 is controlled relative to the inflation characteristics of the bag 18. This can best be explained with reference to FIG. 2, which is a semi-schematic top plan view showing the manner in which the bag 18 inflates in the situation where the passenger is in a more forward position (as in the case of a child leaning against the dashboard), and also showing the manner in which the bag inflates when the passenger is seated in the more usual manner resting against the back of the automobile seat, which is a more rearward position.

Usually a crash restraint bag, such as the one shown at 18, will have venting means to alleviate damaging "rebound action" of the bag. Upon crash impact, when the passenger is thrown against the inflated bag, there is a pressure build up in the bag, and unless proper provisions are made, the bag tends to hurl the passenger back against the seat after cushioning the forward impact. Venting the bag alleviates this since the pressure build up in the bag is dissipated as the passenger moves into the bag to be cushioned thereby. Such venting means is indicated at 88 as openings in the bag 18. The total cross sectional area of the vent opening or openings is dictated by various design considerations, such as total volume of the fully inflated bag, rate of gas flow into the bag, etc.

Figure 2:
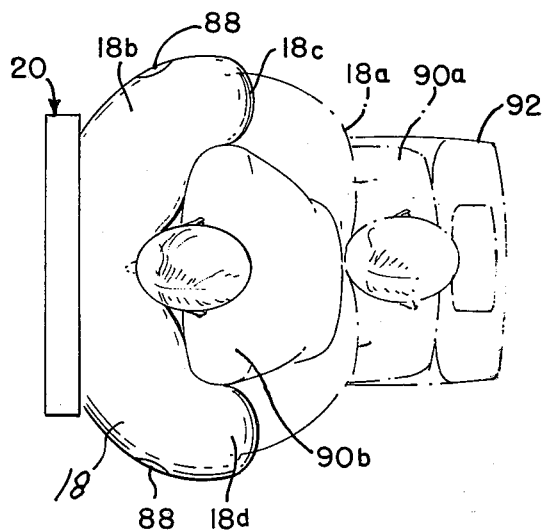
FIG. 2 is a semi-schematic top plan view illustrating the operation of the present invention.
Figure 3:
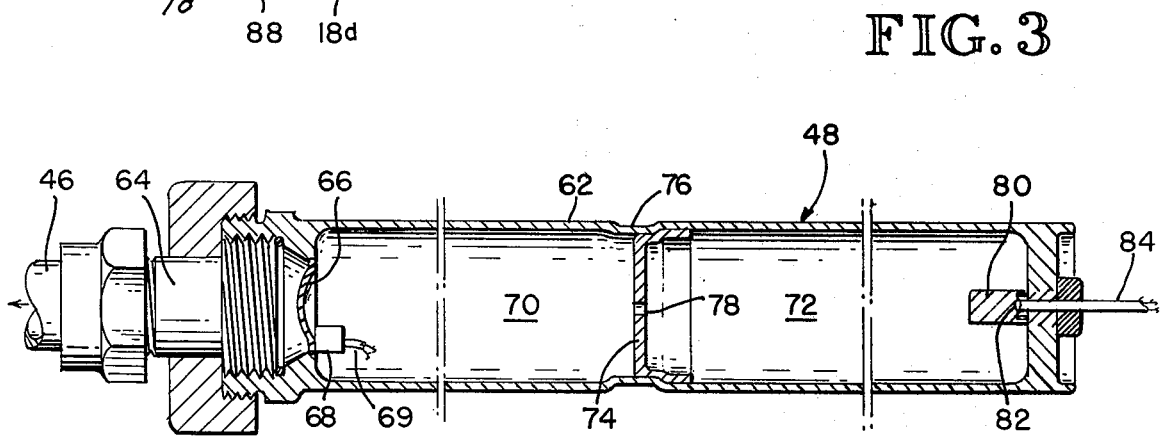
FIG. 3 is a longitudinal sectional view of the aspirating gas source of the present invention.

With reference to FIG. 2, an automobile passenger is shown at 90a in the usual passenger position seated against the back portion 92 of the right hand front seat of the automobile 16. With the passenger 90a so positioned, the bag 18 inflates to a position which for descriptive purposes is termed its "full inflated position," shown in dotted lines at 18a in FIG. 2.

The same passenger is shown at 90b in full lines in FIG. 2 in a forward position, as in the situation where the passenger is leaning or is moved against the dashboard 12 of the automobile. With the passenger 90b in this forward position, the bag (as shown at 18b in full lines in FIG. 2) inflates to a position where the bag reaches around the sides of the passenger 90b, as at 18c and 18d. For purposes of description, this inflated position of the bag (i.e. with the passenger 18b in the forward position and the bag 18 inflating around the passenger) is designated the "intermediate inflated position" of the bag. The inflated volume of the bag 18 in the intermediate inflated position relative to the volume of the bag at its full inflated position, as at 18a depends upon the particular size and configuration of the bag. In bag design presently contemplated for the right hand front passenger, the volume of the bag at intermediate position would be about 50% to 60% of the full inflated volume of the bag.

The aspirating gas source 48 is so arranged with respect to the volume and pressure in the forward chamber 70 relative to the inflating device 20 that the volume of inflating gas (which is the mixture of the aspirating gas and the aspirated air) during the initial inflating phase is approximately equal to the volume of the bag at its intermediate inflated position, plus any inflating gas vented during the initial inflating phase. Thus, in the situation where the passenger is positioned forwardly (as at 90b), during the initial inflation phase the bag inflates to its intermediate position, without any significant tendency to push the passenger rearwardly, since the bag 18 tends to expand where there is least resistance to such expansion.

As indicated previously, during the later inflation phase aspirating gas is exiting from the jets 38 at a lower flow rate, and the inflating pressure is consequently less. With the passenger 90b in a forward position against the bag 18 and decelerating because of the crash impact of the automobile 16, the force of the decelerating passenger causes a back pressure that causes the aspirating inflating device 20 to stall so that little or no aspirating air is drawn into the device 20. The aspirating gas source 48 is so arranged with respect to the size of the orifice 78 and the pressure in the container 62 relative to the inflating device 20 that the flow of aspirating gas into the bag 18 is moderately less then, or at most moderately greater than, the outflow of inflating gas through the vents 88. The rate at which gas is exhausted through the vents 88 is substantially proportional to the pressure in the bag 18, which in turn is roughly proportional to the mass of the passenger divided by that area of the passenger's body that presses against the bag 18. Since the mass divided by body contact area of a small child is less than that of a fully grown adult, with the passenger 90 being a small child, the flow of aspirating gas during the later phase should be such that with the resulting reduced outflow of gas from the bag 18, the bag 18 will inflate at a moderate rate to move the child rearwardly at a slow enough rate so as not to severely injure the child by reason of such rearward movement. According to current information available, such rearward movement of the child should not exceed a rate of approximately twelve miles per hour. With a large adult positioned against the bag 18, the bag will deflate at a moderate rate because of increased rate of flow through the vents 88. Thus, the bag 18 either deflates at a moderate rate, maintains its intermediate inflated position or at most inflates at a moderate rate, depending upon the size of the passenger, so as to provide adequate cushioning for the passenger 18b in the forward position without dangerously hurling a light-weight passenger rearwardly in the car.

In the situation where the passenger is seated against the back seat (as at 90a) during the initial inflating phase, the bag 18 moves out rapidly toward the passenger 90a. Then during the later inflating phase, the momentum of the bag tends to carry it toward its full inflated position, with the flow of aspirating gas during the later inflation phase being sufficient to draw in a substantial amount of aspirated air to complete inflation of the bag 18 to its full inflated position.

What is claimed is:

1. In a vehicle having an occupant location and having structure spaced from said location, a crash restraint apparatus for protecting an occupant in said location from impact with said structure, said apparatus comprising:
   a. an inflatable having a first collapsed position, a second full inflated position so that is provides a protective cushion to an occupant positioned further from said structure in said occupant location, and a third intermediate position wherein the inflatable is inflated to an intermediate volume sufficient to protectively engage an occupant closer to said structure in said occupant location,
   b. an aspirating inflating apparatus comprising:
      1. means defining an aspirating passageway leading into said inflatable, and
      2. aspirating means arranged to direct aspirating gas into said passageway to inflate the inflatable,
   c. vent means operatively associated with said inflatable to permit outflow of gas from said inflatable,
   d. gas supply means to supply an initial amount of aspirating gas to said aspirating means at a higher flow rate sufficient to quickly inflate the inflatable only to a volume at its intermediate position, and to supply a later amount of aspirating gas at a lower flow rate to said aspirating means, such that with said occupant in said position further from said structure so as to permit unobstructed inflation of the inflatable, the inflatable becomes inflated to its full inflated position, and with said occupant in said position closer to said structure so as to exert a back pressure on the inflatable, the lower flow rate of aspirating gas is such relative the vent means that the inflatable is at most inflated at a moderate rate.

2. The apparatus as recited in claim 1, wherein said gas supply means comprises structure defining a first less restricted flow passage for delivery of said initial amount of aspirating gas into said aspirating means, and a second more restricted flow passage for delivery of said later amount of aspirating gas into said aspirating means.

3. The apparatus as recited in claim 2, wherein said less restricted flow passage has an effective cross sectional flow area at least about three times that of the more restricted flow passage.

4. The apparatus as recited in claim 2, wherein said first flow passage is at a location downstream of said second flow passage.

5. The apparatus as recited in claim 1, wherein said gas supply means comprises a first gas source with a less restricted flow passage and a second gas source with a more restricted flow passage.

6. The apparatus as recited in claim 5, wherein said first gas source comprises structure defining a first chamber having a compressed gas therein.

7. The apparatus as recited in claim 6, wherein said second gas source comprises structure defining a second chamber having compressed gas therein.

8. The apparatus as recited in claim 7, wherein said first chamber is located downstream of said second chamber, and the more restricted flow passage is located upstream of said first chamber and downstream of said second chamber.

9. The apparatus as recited in claim 7, wherein said second chamber has an augmented gas source composition therein.

10. The apparatus as recited in claim 1, wherein said gas supply means comprises high pressure containing means defining a first chamber containing a first quantity of compressed gas and a second chamber upstream of said first chamber containing a second quality of compressed gas, said first chamber having a less restricted outlet to enable outflow of compressed gas from said first chamber to said aspirating inflating device at a relatively high flow rate, said second chamber having a more restricted outlet to deliver compressed gas to said aspirating inflating device at a lower flow rate.

11. A fluid supply for use with an occupant restraint system of the type including a confinement having a collapsed inoperative condition and an expanded operative condition for restraining movement of an occupant of a vehicle during a collision and means for directing gas into the confinement, the fluid supply comprising: a pressure vessel including means defining an outlet passage for communicating with the gas directing means, a primary pressure chamber in fluid communication with the outlet passage, a secondary pressure chamber, and means defining an orifice passage in fluid communication with the primary chamber and the secondary chamber to enable fluid to flow from the secondary chamber to the outlet passage via the primary chamber during expansion of the confinement and having an effective cross-sectional area that is less than the effective cross-sectional area of the outlet passage; means sealing the outlet passage; and means operative in response to the collision of the vehicle to disable the sealing means.

12. A fluid supply according to claim 11 wherein: the pressure vessel includes a pressure cavity, a partition divides the pressure cavity into the primary pressure chamber and the secondary pressure chamber, and the means defining the orifice passage is the partition.

13. In an occupant carrying vehicle having an interior with an occupant carrying location and structure spaced from said location, a method of inflating a crash restraint having a unitary inflatable compartment for protecting an occupant in said location from impact with said structure, said method comprising:
   a. directing an initial higher flow of inflating gas into said inflatable compartment to inflate the inflatable compartment only to an intermediate volume sufficient to substantially inflate the inflatable to a position to protectively engage an occupant at said location in a position closer to said inflatable,
   b. then directing a later lower flow of inflating gas into said inflatable compartment and simultaneously venting said inflatable compartment such that the net volume of said inflatable compartment at most increases at a moderate rate, and
   c. the method being further characterized in that said inflating gas is directed into said inflatable compartment by directing an aspirating gas into said inflatable compartment so as to draw aspirated air into said inflatable compartment with said aspirating gas.

14. In an occupant carrying vehicle having an interior with an occupant carrying location and structure spaced from said location, a method of inflating a crash restraint inflatable having a unitary inflatable compartment for protecting an occupant in said location from impact with said structure, said method comprising:
   a. directing an initial higher flow of inflating gas into said inflatable compartment to inflate the inflatable compartment to an intermediate volume sufficient to substantially inflate the inflatable to a position to protectively engage an occupant at said location in a position closer to said inflatable,
   b. then directing a later lower flow of inflating gas into said inflatable compartment and simultaneously venting said inflatable compartment such that the net volume of said inflatable compartment at most increases at a moderate rate, and
   c. said method being further characterized in that the initial higher flow of inflating gas is accomplished by directing an aspirating gas at a relatively high flow rate into said inflatable compartment so as to draw aspirated air into said inflatable compartment, said later lower flow of inflating gas being accomplished by directing aspirating gas at a lower flow into the inflatable compartment so as to draw aspirated air into the inflatable compartment at a lower rate.

15. The method as recited in claim 14, wherein the flow rate of said higher flow of aspirating gas is at least approximately twice as great as that of the lower flow.

16. The method as recited in claim 14, wherein the flow rate of the higher flow of aspirating gas is at least approximately four times as great as that of the lower flow.

17. The method as recited in claim 14, further characterized in that the amount of later lower flow of aspirating gas into the inflatable is at most only moderately greater than outflow of inflating gas by means of said venting.

18. In a vehicle having an occupant location and having structure spaced from said location, a crash restraint apparatus for protecting an occupant in said location from impact with said structure, where the occupant may be in a rearward position spaced from said structure or in an out-of-place position closer to said structure, said apparatus comprising:
   a. an inflatable having a unitary inflatable compartment which has:
      1. a first collapsed position,
      2. a second intermediate inflated position in which the inflatable is inflated partially to a volume sufficient to protectively engage the occupant in said forward position proximate said structure, and 3. a third fully inflated position in which the inflatable is inflated to a position to provide a protective cushion for the occupant in said rearward position further from said structure, b. an inflating device for said inflatable compartment comprising:

1. first means to deliver a higher rate of flow of inflating gas into said inflatable compartment of a volume sufficient only to partially inflate the inflatable compartment to its intermediate position, and 2. second means to deliver a lower rate of flow of inflating gas into said inflatable compartment after said high flow of inflating gas, said lower rate of flow being no greater than that sufficient to increase the net volume of the inflatable compartment at a moderate rate.

19. The apparatus as recited in claim 18, wherein said first means comprises a less restricted flow passage for gas to flow to said inflatable compartment, and said second means comprises a more restricted flow passage for gas to flow to said inflatable compartment.

20. The apparatus as recited in claim 19, wherein said less restricted flow passage is located downstream of said more restricted flow passage.

21. The apparatus as recited in claim 19, wherein said inflating device comprises a source of compressed gas to inflate said inflatable compartment.

22. The apparatus as recited in claim 19, wherein said first means comprises a first source of stored compressed gas having a less restricted outlet for inflating the inflatable compartment, and said second means comprises a second source of stored compressed gas having a more restricted flow outlet passage to said inflatable compartment.

23. The apparatus as recited in claim 18, wherein said first means comprises structure defining a first chamber containing a first quantity of stored compressed gas and having a less restricted passage to enable outflow of compressed gas from said first chamber to the inflatable compartment at a relatively high flow rate, and said second means comprises structure defining a second chamber having a more restricted passage to deliver compressed gas to said inflatable compartment at a lower flow rate.

24. The apparatus as recited in claim 18, wherein there is vent means to provide an outflow of gas from said inflatable compartment, and said inflating means is arranged that said second flow rate is at most sufficient relative to the outflow through said vent menas in a situation where said inflatable is experiencing a back pressure as from engaging an occupant in said position nearer said vehicle structure, that the inflatable compartment at most inflates at a moderate rate so as not to hurl the occupant rearwardly with such violence as to cause severe injury.

25. The apparatus as recited in claim 18, wherein:

a. said first means comprises:

1. means defining a first downstream chamber adapted to contain high pressure inflating gas, 2. means defining a first less restricted passage leading from said first chamber to said inflatable and adapted to transmit inflating gas to said inflatable at said higher rate, b. said means comprises:

1. means defining a second chamber upstream of said first chamber, 2. means defining a second more restricted passage leading from said second chamber into said first chamber, said second passage being of a size to transmit inflating gas at said lower flow rate, and 3. said second passage means being substantially the only flow passage between said second and first chambers.

26. In an occupant carrying vehicle having an interior with an occupant carrying location and structure spaced from said location, a method of inflating a crash restraint inflatable having a unitary inflatable compartment for protecting an occupant in said location from impact with said structure, where the occupant may be in a rearward position spaced from said structure or in an out-of-place position closer to said structure, and in which said inflatable has:

a. a first collapsed position, b. a second intermediate inflated position in which the inflatable is partially inflated to a volume sufficient to protectively engage the occupant in a forward position closer to said structure, and c. a third fully inflated position in which the inflatable is inflated to a position to provide a protective cushion for the occupant in said rearward position further from said structure, said method comprising:

a. directing an initial higher flow of inflating gas into said inflatable compartment to rapidly inflate the inflatable compartment to an intermediate volume sufficient to substantially inflate the inflatable to said intermediate position, and b. then directing a later lower flow of inflating gas into said inflatable compartment and simultaneously venting said inflatable compartment such that with a forwardly positioned occupant exerting a back pressure on said inflatable in said intermediate position, the net volume of said inflatable compartment at most increases at a moderate rate as said inflatable moves toward said third position.

27. The method as recited in claim 26, further comprising directing said later flow of inflating gas into the inflatable compartment at a flow rate approximately no greater than the flow rate at which inflating gas is vented from the inflatable.

28. The method as recited in claim 26, wherein said higher gas flow is accomplished by directing gas through a less restricted flow passage into said compartment, and said lower gas flow is accomplished by directing inflating gas through a more restricted flow passage into said compartment.

29. The method as recited in claim 28, wherein compressed gas is directed through said less restricted flow passage and said more restricted flow passage.

30. The method as recited in claim 26, wherein the flow rate of said higher flow of inflating gas is at least approximately twice as great as that of the lower flow.

31. The method as recited in claim 30, wherein the flow rate of the higher flow of inflating gas is at least approximately four times as great as that of the lower flow.

32. The method as recited in claim 26, further characterized in that the amount of later lower flow of inflating gas into the inflatable is at most only moderately greater than outflow of inflating gas by means of said venting.

* * * * *